March 1, 1932.  A. O. AUSTIN  1,847,422
TRANSMISSION LINE CONSTRUCTION
Filed March 16, 1929
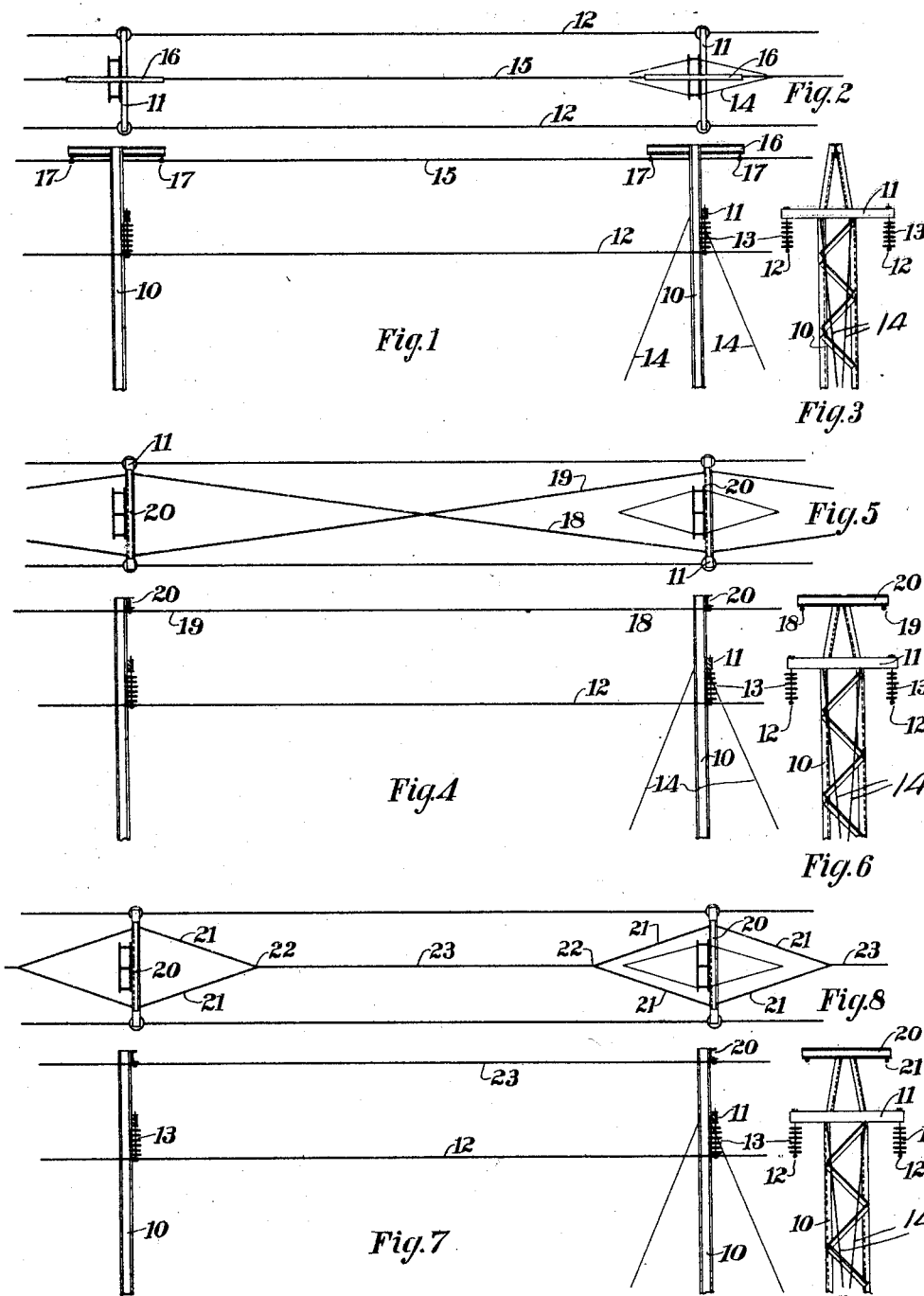
INVENTOR
Arthur O. Austin.
BY Alpheus J. Crane
ATTORNEY Patented Mar. 1, 1932

1,847,422

UNITED STATES PATENT OFFICE

ARTHUR O. AUSTIN, OF NEAR BARBERTON, OHIO, ASSIGNOR, BY MESNE ASSIGNMENTS, TO THE OHIO BRASS COMPANY, OF MANSFIELD, OHIO, A CORPORATION OF NEW JERSEY

TRANSMISSION LINE CONSTRUCTION

Application filed March 16, 1929. Serial No. 347,599.

This invention relates to the construction of electrical transmission lines and has for one of its objects the provision of means for overcoming torsional stresses to which the supporting towers or poles of transmission lines are apt to be subjected.

A further object is to provide a transmission line construction in which abnormal stresses will be distributed among a number of supporting structures, thus making it possible to employ lighter structures for the individual supports.

A further object is to provide a transmission line construction which shall be economical, efficient and of improved construction and operation.

Other objects and advantages will appear from the following description.

The invention is exemplified in the combination and arrangement of parts shown in the accompanying drawings and described in the following specification, and it is more particularly pointed out in the appended claims.

In the drawings:

Fig. 1 is a diagrammatic elevation showing a portion of a transmission line having one embodiment of the present invention applied thereto.

Fig. 2 is a top plan view of the structure shown in Fig. 1.

Fig. 3 is a view looking from the right in Fig. 1.

Figs. 4, 5 and 6 are views similar to Figs. 1, 2 and 3 respectively, showing a modified form of the invention.

Figs. 7, 8 and 9 are views similar to Figs. 1, 2 and 3, respectively, showing another modification.

The supporting structures for transmission line towers, under normal operation, are not subjected to very heavy stresses in the direction of the line since the conductors carried by the supporting structure extend in both directions therefrom and the force exerted upon the tower or pole in one direction is ordinarily counterbalanced by an opposite force exerted by the conductor extending in the opposite direction. This makes it possible to use wood poles or A frame towers which may offer but small resistance to torsion or displacement in the longitudinal direction of the line. Under some conditions, however, such structures may be subjected either to heavy longitudinal forces or to torsional moments. Where longitudinal stresses occur, the wood poles or A frame towers bend in the direction of the stress and thus tend to pass the stress along the line and distribute the effect to a number of poles or towers. If a conductor at one side of the supporting structure should break or be burned in two or if the structure is subjected to unequal loading of ice or sleet, the flexing of the tower in the direction of the line will distribute the unequal loading to a number of supporting structures. If the conductor at one end of a cross arm should be broken on one side of the structure while the conductor remains intact on the other side, the structure will be submitted to a torsional moment which may twist the tower or bend or break the cross arm and produce serious damage. Twisting of the tower not only injures the tower structure but destroys the spacing of the various conductors carried by the tower so that serious shorts and grounds may result. Supporting structures are also frequently subjected to unequal loading during construction of the line and before the conductors are all in place.

The present invention provides means for utilizing the ground wire or wires ordinarily employed in connection with transmission lines for reducing or overcoming the effects of torsional stresses to which a transmission line may be subjected.

In the form of the invention shown in Figs. 1, 2 and 3, the numeral 10 designates a supporting structure which may be an A frame, a pole or other flexible support. The support 10 is provided with cross arms 11 having conductors 12 suspended therefrom by insulator strings 13 in the usual manner. Occasional supports along the line are provided with guy wires 14. Mounted on the structures 10 is a ground wire 15 which is connected to the supporting structures by elongated radius arms or seat members 16, the ground wire being held by clamps 17 at each end of the seat member 16. The ground wire may be attached to the long seats 16 by any suitable clamping arrangement and may be carried either on top of the seat member 16 or below or at either side. It will be apparent that the seats 16 extending for a considerable distance along the ground wire will act to resist twisting of the supports 10 so that when the towers are subjected to torsion, the amount of displacement will be decreased by the resistance offered by the ground wire 15 acting on the seat member or radius arm 16.

In the construction shown in Figs. 4, 5 and 6, two crossed ground wires 18 and 19 are employed which are connected to a cross arm 20 secured to the tower 10. It will be apparent that this arrangement braces the towers against torsional stresses to which they may be subjected and also tends to distribute such torsional moments among a number of towers in the line. It, of course, is not necessary to cross the ground wires between every pair of towers but the ground wires may be run parallel with the conductors through a portion of the line and then cross one or more times, the crossings being interspersed with the sections having parallel ground wire arrangement.

In the construction shown in Figs. 7, 8 and 9, converging wires 21 are secured to the opposite ends of the arm 20 and are fixed to each other at a common point 22. The adjacent points 22 are connected by a common wire or cable 23. It will be seen that the branched wires 21 form a bridle which tends to hold the supporting towers from torsional movement. A similar result may be secured by fixing the ground wires 18 and 19 in Fig. 4 firmly together where they cross each other between the different supporting towers.

It may be said in general that a light ground wire of high strength steel will produce lower stresses than a heavy ground wire of lower strength as the light ground wire has a comparatively small sag which, with the spring of the tower, will greatly relieve the stress. It will be apparent that modifications of the arrangement illustrated may be made by those skilled in the art without departing from the spirit and scope of the invention, and I therefore do not wish to be limited to the exact constructions shown except as pointed out in the appended claims.

I claim:

1. In transmission line construction, a supporting structure, conductor lines carried by said structure, a radius arm rigid with said structure and extending horizontally from the vertical axis thereof parallel with said transmission line, and means secured to said radius arm for bracing said structure against torsional forces exerted thereon by said conductor lines.

2. A transmission line comprising spaced supporting structures, cross arms carried by said structures, a transmission conductor mounted on said cross arms, a ground wire carried by said structures and extending parallel with said transmission conductor, and an elongated seat for connecting said ground wire to said structures and providing a radius arm for enabling said ground wire to resist torsional moments on said supporting structures, said radius arm being extended from said supporting structure parallel with said ground wire.

3. A transmission line comprising a supporting structure, a transmission conductor carried by said structure, an arm rigid with said supporting structure and projecting therefrom parallel with said transmission conductor and a ground wire carried by said structure, said ground wire being fixed to said arm at a point spaced laterally from the vertical axis of said supporting structure to enable said ground wire to resist torsional forces on said structure.

4. A transmission line comprising a supporting structure, a transmission conductor carried by said structure, a radius arm fixed to said structure and extending therefrom in a direction substantially parallel to said transmission conductor, said ground wire being fixed to said arm at points spaced from said structure at opposite sides thereof along said ground wire.

In testimony whereof I have signed my name to this specification this 13th day of March, A. D. 1929.

ARTHUR O. AUSTIN.